J. G. Krichbaum.
Water Pail Ear.

No. 89,666.  Patented May 4, 1869.

Witnesses;
J. H. C. Burridge
Frank S. Alden.

Inventor;
J. George Krichbaum

J. GEORGE KRICHBAUM, OF YOUNGSTOWN, OHIO.

Letters Patent No. 89,666, dated May 4, 1869.

IMPROVEMENT IN EARS FOR WATER-PAILS.

The Schedule referred to in these Letters Patent and making part of the same.

*To all whom it may concern:*

Be it known that I, J. GEORGE KRICHBAUM, of Youngstown, in the county of Mahoning, and State of Ohio, have invented certain new and useful Improvements in Water-Pails; and I do hereby declare that the following is a full and complete description of the same, reference being had to the accompanying drawing making part of this specification, in which—

Figure 1:
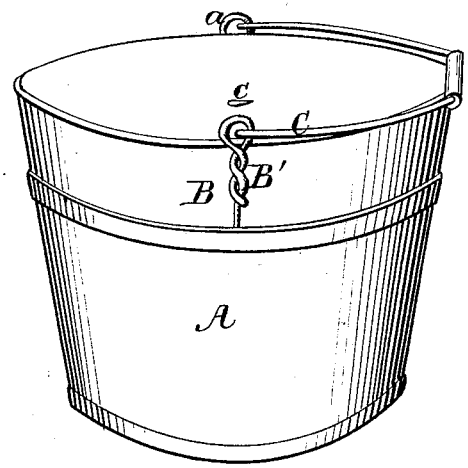
Figure 2:
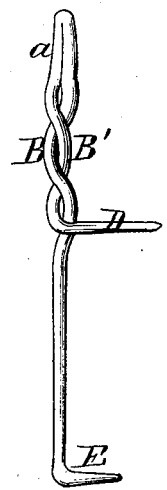

Figure 1 is a perspective view of the pail.
Figure 2, a detached section.

Like letters refer to like parts in the different views.

The nature of this invention relates to the ears of a water-pail, said ears being constructed of iron and attached thereto without nails or screws, as set forth.

In fig. 1, A represents an ordinary wooden pail, of which B are the ears and C the bail; said ears are made of wire twisted into a loop $a$, in which the bail is hooked; one end of said wire is turned out at a right angle, forming a spike or nail-like prong D, fig. 2, whereas the opposite end is continued down below the twist, and also terminates in a right-angled prong E, and in the same direction.

These ears are secured to the pail by first boring holes therein in which the prongs are inserted, which being done they are then clinched down upon the inside, as shown at C, fig. 1, all of which is easily and quickly done, thus providing the pail with a simple, neat, and durable pair of ears, stronger and much less expensive than those in ordinary use.

The post B' of the ear is twisted, which prevents the loop $a$ from opening or spreading by the strain to which it is subjected in using; and by this means the only fastening required to secure the ear to the pail are the prongs D E, which are arranged one above the other, the lower one passing under the hoop; by this means of attaching the ear to the pail, greater strength and security are obtained than in the ordinary way.

What I claim as my improvement, and desire to secure by Letters Patent, is—

The twisted ear, with prongs arranged as described, in combination with the pail, in the manner and for the purpose set forth.

J. GEORGE KRICHBAUM.

Witnesses:
 JOHN BAYERS,
 OWEN ENNIS.